US009626553B2

(12) United States Patent
Sato

(10) Patent No.: US 9,626,553 B2
(45) Date of Patent: Apr. 18, 2017

(54) OBJECT IDENTIFICATION APPARATUS AND OBJECT IDENTIFICATION METHOD

(71) Applicant: CANON KABUSHIKI KAISHA, Tokyo (JP)

(72) Inventor: Hiroshi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 14/853,777

(22) Filed: Sep. 14, 2015

(65) Prior Publication Data

US 2016/0078284 A1   Mar. 17, 2016

(30) Foreign Application Priority Data

Sep. 17, 2014   (JP) ................................. 2014-189168

(51) Int. Cl.
*G06K 9/00* (2006.01)
*G06F 17/30* (2006.01)
*G06K 9/62* (2006.01)

(52) U.S. Cl.
CPC ......... *G06K 9/00288* (2013.01); *G06F 17/30* (2013.01); *G06F 17/30259* (2013.01); *G06K 9/00281* (2013.01); *G06K 9/6255* (2013.01); *G06K 9/6271* (2013.01)

(58) Field of Classification Search
CPC ............. G06K 9/00288; G06K 9/6271; G06K 9/6255; G06K 9/00281; G06F 17/30259; G06F 17/30
USPC ......................................................... 382/118
See application file for complete search history.

(56) References Cited

U.S. PATENT DOCUMENTS

| 9,235,782 B1* | 1/2016 | Zomet ................ G06K 9/00281 |
| 2007/0172126 A1* | 7/2007 | Kitamura ................. G06K 9/03 382/190 |
| 2008/0187186 A1* | 8/2008 | Togashi ............ G06K 9/00268 382/118 |
| 2009/0196467 A1* | 8/2009 | Okubo ............... G06K 9/00288 382/118 |

(Continued)

FOREIGN PATENT DOCUMENTS

JP   4379459 B2   12/2009

OTHER PUBLICATIONS

Yin et al., "An Associate-Predict Model for Face Recognition", pp. 497-504, CVPR, 2011.

(Continued)

*Primary Examiner* — John Strege
(74) *Attorney, Agent, or Firm* — Canon USA, Inc. I.P. Division

(57) ABSTRACT

An object identification apparatus selects, for each partial area of an object in a registered image, a corresponding sample image from sample images based on feature quantities of the partial area, for objects in the registered image, sets a similarity of feature quantities for each partial area between objects of an identical individual and between objects of different individuals based on a similarity related to the selected sample images for each partial area, makes a discriminator learn based on the set similarity, acquires a similarity for each partial area between objects in an input image and the registered image, and determines whether the object in the input image is identical to the object in the registered image based on the acquired similarity and a result of discrimination by the discriminator.

10 Claims, 15 Drawing Sheets

(56) References Cited

U.S. PATENT DOCUMENTS

| | | | |
|---|---|---|---|
| 2009/0297046 A1* | 12/2009 | Zhao | G06K 9/00275 382/224 |
| 2011/0219012 A1* | 9/2011 | Yih | G06F 17/30 707/749 |
| 2013/0163829 A1* | 6/2013 | Kim | G06K 9/00288 382/118 |
| 2015/0235073 A1* | 8/2015 | Hua | G06K 9/00288 382/118 |
| 2015/0339516 A1* | 11/2015 | Yano | G06K 9/00281 382/118 |
| 2016/0005171 A1* | 1/2016 | Watanabe | G06T 7/204 382/118 |

OTHER PUBLICATIONS

Viola et al., "Robust real-time face detection", International Journal of Computer Vision 57, vol. 2, pp. 137-154, 2004.

* cited by examiner

OBJECT IDENTIFICATION APPARATUS AND OBJECT IDENTIFICATION METHOD

BACKGROUND OF THE INVENTION

Field of the Invention

The present invention relates to an object identification apparatus and an object identification method.

Description of the Related Art

There has been a face identification technique for identifying an individual face in pattern recognition, particularly as a technique for discriminating whether an individual subject in an image is identical to an individual subject in another image. Hereinafter in the present specifications, object identification means determining differences between individual objects (for example, differences between individual persons), while object detection means determining that objects are in the same category, without identifying individuals (for example, detecting a human face without identifying an individual person).

The identification performance of an apparatus and a method for performing the above-described pattern recognition (recognition of an object, a human face, etc. in an image) is degraded due to variations between a registration target pattern and an authentication target pattern. More specifically, the degrading factors include variations of an identification target object such as a human face, for example, illumination condition variations, attitude and orientation variations, being hidden by other object, facial expression variations, and so on. There is a problem that large variations between the registration target pattern and the authentication target pattern will remarkably degrade the identification performance.

As a technique for addressing this problem, there is a technique for focusing on local portions of an object in an image. For example, generally, when the object is a human face, effects of the above-described variations do not appear uniformly over the entire range of the face in face image data in which a certain individual is captured. For example, in the case of facial expression variations between an expressive face image and a blank face image, fewer variations are expected in the vicinity of the nose than the mouth or eyes. Similarly, in the case of illumination variations between a face image exposed to oblique light and a face image entirely exposed to uniform illumination, variations at a portion exposed to oblique light are expected to be smaller than variations at a portion not exposed to oblique light. Further, when the face looks towards the left relative to an observer, the left side of the face hides in the depth direction because of the three-dimensional shape of the face, and therefore the left side of the face provides a larger variation from the front face than a variation of the right side from the front face. Therefore, in a case where variations such as facial expression variations, illumination variations, and face orientation variations occur, even if variations of a certain local area are so large that individual identification is not possible, variations of other local areas may be such an extent that individual identification is possible. More specifically, it is considered that selectively integrating the similarities of local areas providing comparatively small variations may enable favorable individual identification.

Further, it is generally considered that including sufficient variations in the registration target pattern in advance is effective to cope with large variations. For example, in the case of a human face, it is useful to register images having illumination condition variations, aspect and orientation variations, variations when hidden, facial expression variations, etc., for each registered individual. If conditions possibly occurring in image capturing are included in registered images in advance, the improvement in recognition accuracy can be expected.

However, preparing many registered images decreases user-friendliness. Further, there is a problem that preparing variation patterns that contribute to the accuracy improvement is actually difficult.

To solve the above-described problem, Japanese Patent No. 4379459 discusses a technique for increasing the number of registered images by pseudo-generating diverse variation images from one image by using three-dimensional shapes of registered objects.

Further, [Qi Yin, Xiaoou Tang, and Jian Sun. "An Associate-Predict Model for Face Recognition." Computer Vision and Pattern Recognition (CVPR), 2011.] discusses a technique for preparing a sufficient number of data items regarding race, gender, and age and reconfiguring an image close to an input image based on the prepared data. The prepared data is associated with data including facial orientation variations and illumination condition variations. Therefore, for example, a front face image can be reconfigured based on a side face image.

To improve the recognition accuracy, a technique for separately preparing a discriminator specialized for registered objects have been studied over the years. Since this technique performs machine learning when an image is registered, it is also referred to as online learning. Although the online learning is an effective technique for accuracy improvement, the following two major problems arise. The first problem is a problem of learning data. As described above, if user-friendliness is taken into consideration, it is desirable that the number of registered object images is as small as possible. On the other hand, to make the discriminator specialized for registered objects, a sufficient amount of learning data is required to a certain extent. The second problem is an amount of calculations. Although machine learning is generally performed by utilizing various statistical processing and numerical calculations, the processing amount becomes a problem when incorporating the data into apparatuses having limited calculation resources such as digital cameras and mobile phones. The first problem may possibly be avoided by generating variation images based on a small number of registered images, using the above-described method. However, the method makes the second problem more complicated since images are input. More specifically, the processing load increases if high dimensional data such as images are input to carry out machine learning. On the other hand, if the amount of learning data is decreased to reduce the processing load, it becomes impossible to include sufficient variations, making it difficult to perform the accuracy improvement. Because of the above-described problems, it has been impossible to effectively utilize online learning while maintaining user-friendliness.

SUMMARY OF THE INVENTION

The present invention is directed to effectively utilizing online learning while maintaining user-friendliness.

According to an aspect of the present invention, an object identification apparatus includes, a storage unit configured to, for objects in a plurality of sample images, store feature quantities of a plurality of predetermined partial areas, and a similarity of feature quantities for each partial area between objects of an identical individual and between objects of different individuals, a selection unit configured to, for each partial area of an object in a registered image, select a corresponding sample image from the storage unit based on feature quantities of the partial area, a setting unit configured to, for objects in the registered image, set a similarity of feature quantities for each partial area between objects of an identical individual and between objects of different individuals based on a similarity related to the selected sample images for each partial area, a learning unit configured to make a discriminator learn based on the set similarity, an acquisition unit configured to acquire a similarity for each partial area between an object in an input image and the object in the registered image, and a determination unit configured to determine whether the object in the input image is identical to the object in the registered image based on the similarity acquired by the acquisition unit and a result of discrimination by the discriminator.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings.

Figure 1:
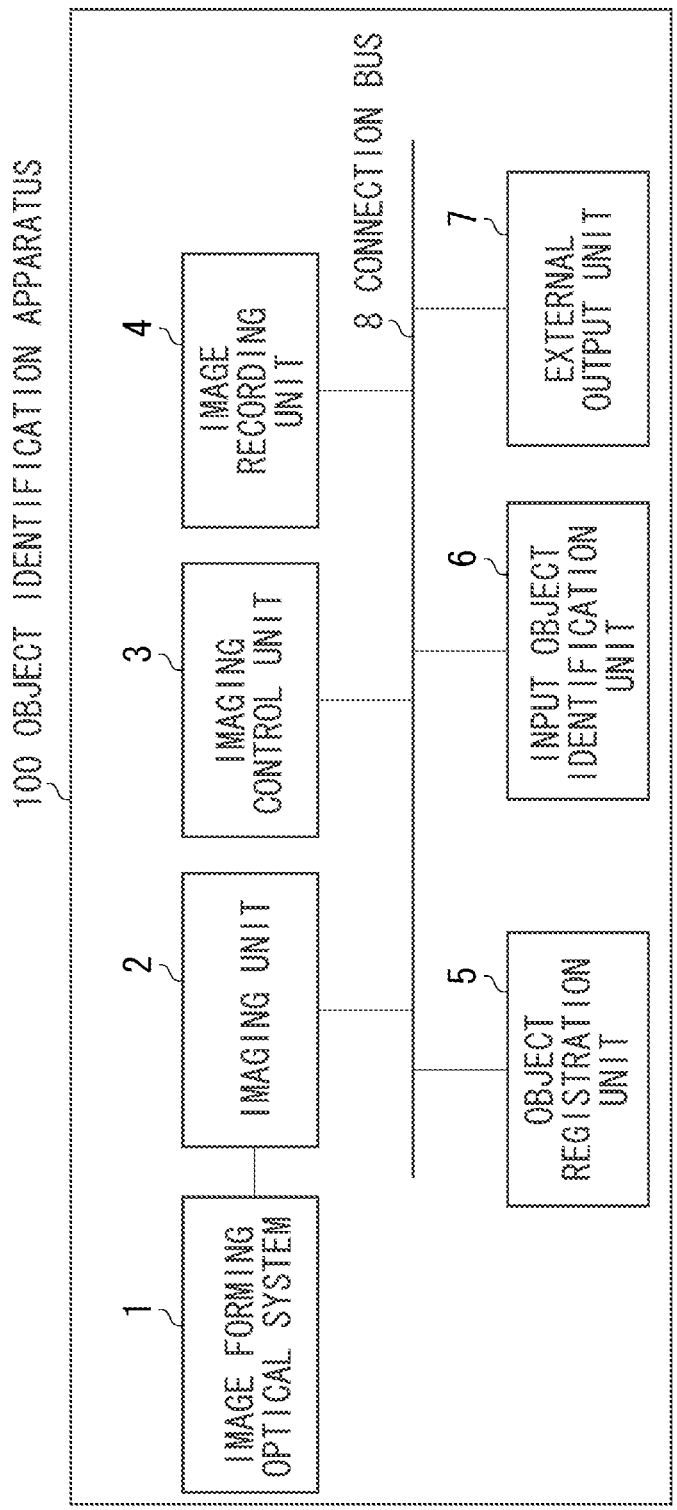
FIG. 1 illustrates an example of a hardware configuration of an object identification apparatus.

FIG. 1 illustrates an example of an overall hardware configuration of an object identification apparatus 100. The object identification apparatus 100 includes an image forming optical system 1, an imaging unit 2, an imaging control unit 3, an image recording unit 4, an object registration unit 5, an input object identification unit 6, an external output unit 7, and a connection bus 8.

The image forming optical system 1 may include an optical lens provided with a zoom mechanism, and a pan tilt axis direction drive mechanism.

The imaging unit 2 typically includes a charge coupled device (CCD) or a complementary metal oxide semiconductor (CMOS) image sensor, and outputs predetermined image signals (signals acquired through sub-sampling and block reading) as image data based on a reading control signal from a sensor drive circuit.

The imaging control unit 3 controls the timing of actual image capturing in response to an instruction by a photographer's operation (viewing angle adjustment instruction, shutter depression, etc.) and based on information from the object registration unit 5 and the input object identification unit 6.

The image recording unit 4 includes a semiconductor memory, stores image data transmitted from the imaging unit 2 in the memory, and, in response to a request from the object registration unit 5 and the input object identification unit 6, transmits image data to these units at a predetermined timing.

The object registration unit 5 extracts information about an identification target object from image data, and records and stores the information. The configuration and processing of the object registration unit 5 will be described in detail below with reference to FIGS. 3 to 8.

The input object identification unit 6 identifies an object based on image data such as image data acquired from the object registration unit 5. The configuration and processing of the input object identification unit 6 will be described in detail below with reference to FIGS. 9 to 13.

The external output unit 7 typically includes a monitor such as a thin-film-transistor (TFT) liquid crystal display, and displays image data acquired from the imaging unit 2 and the image recording unit 4, or image data including superimposed output results from the object registration unit 5 and the input object identification unit 6. The external output unit 7 may output the output results of the object registration unit 5 and the input object identification unit 6, to an external memory as electronic data.

The connection bus 8 is a bus for performing control and data connection between components of the object identification apparatus 100.

The imaging control unit 3, the object registration unit 5, and the input object identification unit 6 may include a dedicated circuit (an application specific integrated circuit (ASIC)), a processor (a reconfigurable processor, a digital signal processor (DSP), a central processing unit (CPU), etc.) respectively.

The imaging control unit 3, the object registration unit 5, and the input object identification unit 6 may be implemented as software configurations in the object identification apparatus 100. More specifically, the object identification apparatus 100 further includes a CPU and a memory as a hardware configuration. Functions of the imaging control unit 3, the object registration unit 5, and the input object identification unit 6 are implemented when the CPU executes processing based on a program stored in memory.

However, when the imaging control unit 3, the object registration unit 5, and the input object identification unit 6 include a dedicated circuit and a processor respectively, the imaging control unit 3, the object registration unit 5, and the input object identification unit 6 implement the following functions and processing. More specifically, the above-described functions and processing are implemented when the above-described dedicated circuit and processor perform processing based on a program stored in a hard disk drive or a read only memory (ROM).

[Overall Processing]

Figure 2:
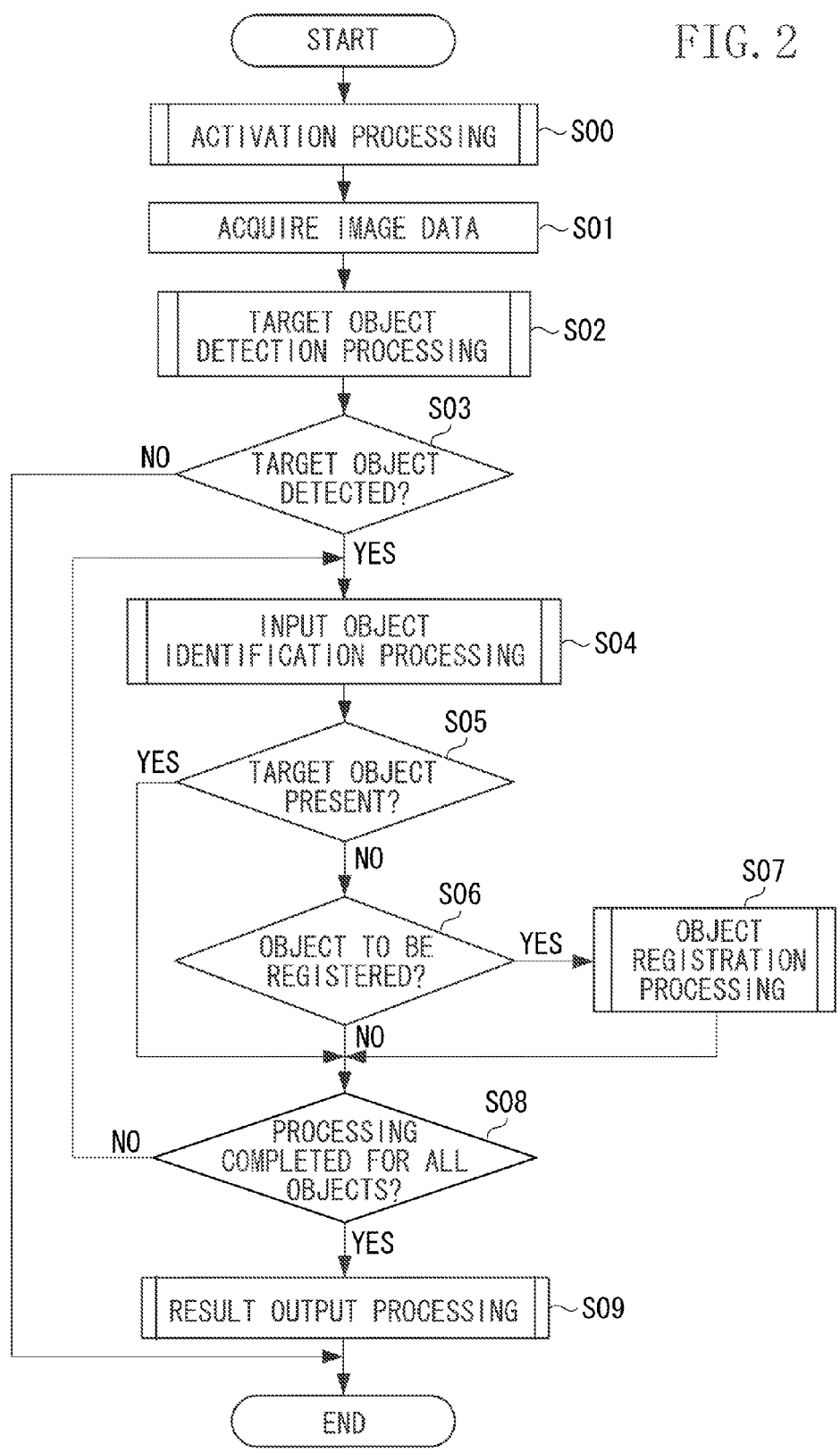
FIG. 2 is a flowchart illustrating an example of processing in the object identification apparatus.

FIG. 2 is a flowchart illustrating an example of processing of the object identification apparatus 100. Processing for input object identification actually performed by the object identification apparatus 100 will be described below with reference to FIG. 2. An input object refers to an object within an input image. Although a case where the identification target object is a human face will be described below, the identification target object is not limited thereto, and may be an overall image of a person, a road sign, etc.

In step S00, the object identification apparatus 100 performs initiation processing. Each component of the object identification apparatus 100 performs processing set to be performed at the time of initiation. The object registration unit 5 and the input object identification unit 6 perform processing for reading parameters to be used from a storage unit such as a hard disk drive and a ROM.

In step S01, the object identification apparatus 100 acquires processing target image data from the image recording unit 4. The image data is an example of an input image.

In step S02, the object identification apparatus 100 performs human face detection processing on the image data acquired in step S01. To detect a human face from image data, for example, a known technique such as a technique discussed in [P. Viola and M. Jones, "Robust real-time face detection", pp. 747, Eighth International Conference on Computer Vision (ICCV'01)—Volume 2, 2001.] may be used.

In step S03, the object identification apparatus 100 determines whether a human face is detected in the detection processing in step S02. When the object identification apparatus 100 detects a human face in the detection processing in step S02 (YES in step S03), the processing proceeds to step S04. On the other hand, when the object identification apparatus 100 does not detect a human face in the detection processing in step S02 (NO in step S03), the processing exits the flowchart.

In step S04, the object identification apparatus 100 performs identification processing on the human face detected in step S02. More specifically, the input object identification unit 6, a component of the object identification apparatus 100, performs the processing in step S04. The relevant processing will be described in detail below with reference to FIGS. 9 to 13.

In step S05, based on the result of the identification processing in step S04, the object identification apparatus 100 determines whether the person of whom a human face was detected in step S02 is included in registered persons. When the object identification apparatus 100 determines that the person of whom a human face was detected in step S02 is included in registered persons (YES in step S05), the processing proceeds to step S08. On the other hand, when the object identification apparatus 100 determines that the person of whom a human face was detected in step S02 is not included registered persons (NO in step S05), the processing proceeds to step S06.

In step S06, the object identification apparatus 100 determines whether the person of whom a human face was detected in step S02 is to be registered. The object identification apparatus 100 may determine whether to register the person of whom a human face was detected in step S02, based on a predetermined setting, or may determine whether to register the person of whom a human face was detected in step S02, based on a user operation via an operation unit. The object identification apparatus 100 determines that it registers the person of whom a human face was detected in step S02 (YES in step S06), the processing proceeds to step S07. On the other hand, when the object identification apparatus 100 determines that it does not register the person of whom a human face was detected in step S02 (NO in step S06), the processing proceeds to step S08.

In step S07, the object identification apparatus 100 performs human face registration processing on the person of whom a human face was detected in step S02. More specifically, the object registration unit 5, a component of the object identification apparatus 100, performs the processing in step S07. The relevant processing will be described in detail below with reference to FIGS. 3 to 8. When the human face registration processing is performed on the person of whom a human face was detected in step S02, the image acquired in step S01 becomes an example of a registered image.

In step S08, the object identification apparatus 100 determines whether the processing in steps S04 to S07 is completed for all of the human faces detected in step S02. When the object identification apparatus 100 determines that the processing in steps S04 to S07 is completed for all of the human faces detected in step S02 (YES in step S08), the processing proceeds to step S09. On the other hand, when the object identification apparatus 100 determines that the processing in steps S04 to S07 is not completed for all of the human faces detected in step S02 (NO in step S08), the processing proceeds to step S04.

In step S09, the object identification apparatus 100 outputs the result of the processing for determining whether the person of whom a human face was detected in step S02 is included in registered persons, via the external output unit 7. When the object identification apparatus 100 performs human face registration processing for a new person in step S07, the object identification apparatus 100 may output the result of the registration processing.

The above describes the overall processing of the object identification apparatus 100 according to the present exemplary embodiment.

[Object Registration Unit]

Figure 3:
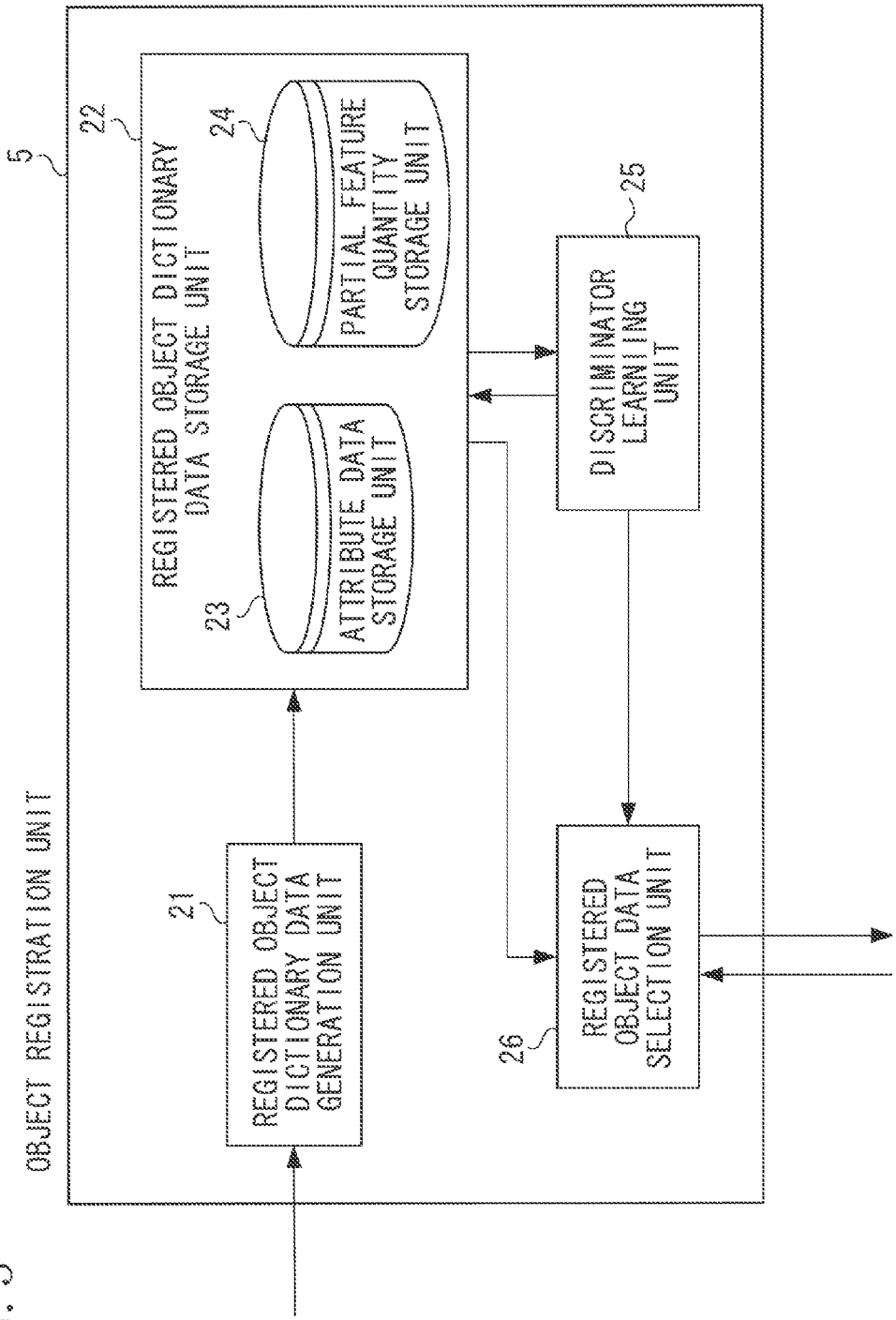
FIG. 3 illustrates an example of a functional configuration of an object registration unit.

Object registration processing will be described below with reference to FIG. 3. FIG. 3 illustrates an example of a functional configuration of the object registration unit 5. The object registration unit 5 includes a registered object dictionary data generation unit 21, a registered object dictionary data storage unit 22, a discriminator learning unit 25, and a registered object data selection unit 26. The registered object dictionary data storage unit 22 includes an attribute data storage unit 23 and a partial feature quantity storage unit 24.

The registered object dictionary data generation unit 21 generates registered object dictionary data required to identify individual objects based on image data acquired from the image recording unit 4. The processing performed by the registered object dictionary data generation unit 21 will be described in detail below with reference to FIG. 4.

The registered object dictionary data storage unit 22 stores as dictionary data the partial feature quantities of the registered objects acquired by the registered object dictionary data generation unit 21. Registered objects refer to objects in a registered image. The registered object dictionary data storage unit 22 may acquire attribute data from the registered object dictionary data generation unit 21 or acquire attribute data based on a user operation via the operation unit at the time of registration.

The attribute data storage unit 23 stores attributes of an object to be registered, for example, gender, age, facial expression, and facial orientation when the object is a human face.

The partial feature quantity storage unit 24 stores the partial feature quantities extracted by the registered object dictionary data generation unit 21.

The discriminator learning unit 25 performs a learning of the discriminator to be used by the input object identification unit 6. The processing performed by the discriminator learning unit 25 will be described in detail below with reference to FIGS. 5 to 8.

The registered object data selection unit 26 performs the following processing in response to a request from the input object identification unit 6. More specifically, the registered object data selection unit 26 acquires dictionary data to be used for identification and parameters for the discriminator from the registered object dictionary data storage unit 22 and the discriminator learning unit 25, and transmits these information to the input object identification unit 6.

[Registered Object Dictionary Data Generation Unit]

Figure 4:
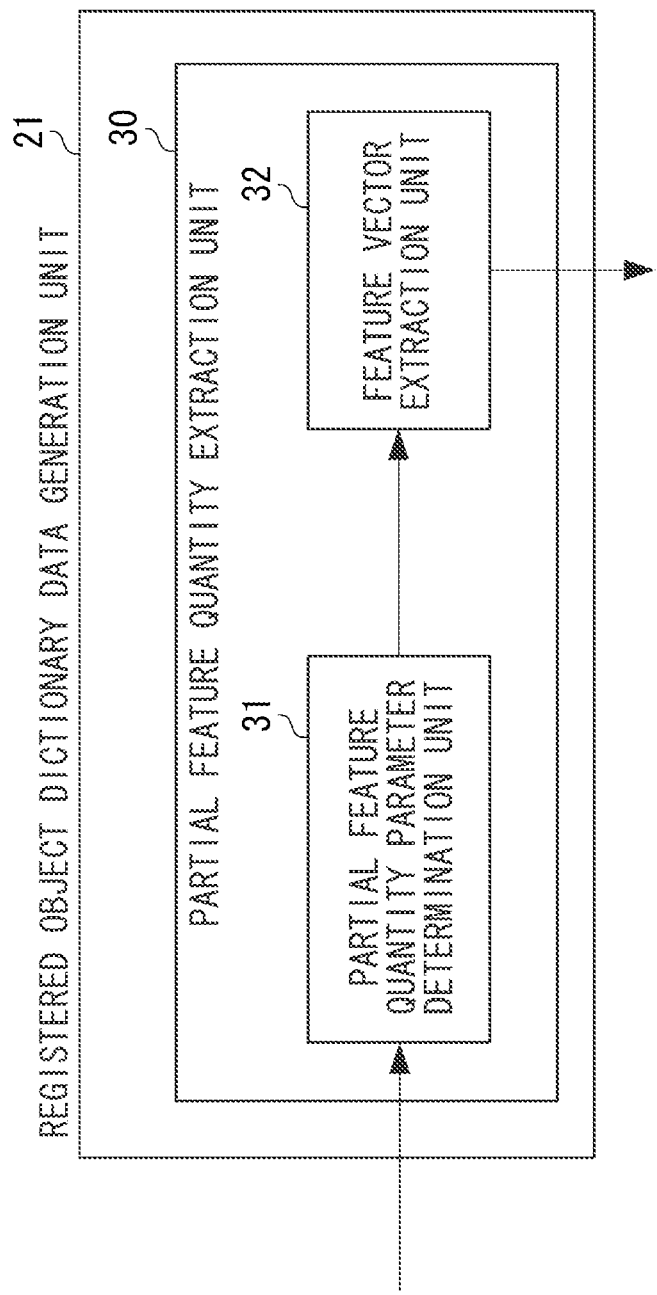
FIG. 4 illustrates an example of a functional configuration of a registered object dictionary data generation unit.

FIG. 4 illustrates an example of a functional configuration of a registered object dictionary data generation unit 21. The registered object dictionary data generation unit 21 includes a partial feature quantity extraction unit 30. The partial feature quantity extraction unit 30 includes a partial feature quantity parameter determination unit 31 and a feature vector extraction unit 32.

The partial feature quantity extraction unit 30 performs processing for extracting feature vectors from image data containing a target object.

The partial feature quantity parameter determination unit 31 determines parameters to be used for feature vector extraction processing by the feature vector extraction unit 32 for the image data. Typically, the parameters including positions and ranges determined to extract partial feature quantities. Further, the parameters also include feature quantity parameters used when extracting partial feature quantities. Hereinafter, partial areas refer to determined positions and areas for extracting partial feature quantities. A partial area is an example of a feature portion. The partial feature quantity parameter determination unit 31 may preset positions and ranges of partial areas and other feature quantity parameters by using a machine learning method. The partial feature quantity parameter determination unit 31 may preset the number of partial areas subjected to feature quantity extraction in consideration of the time required for processing. Further, the partial feature quantity parameter determination unit 31 may determine the relevant parameters by measuring values for prepared learning samples with which sufficient identification performance can be acquired. The partial feature quantity parameter determination unit 31 may issue a plurality of parameters for one partial area. The purpose and effects of setting a plurality of feature quantity extraction parameters for one partial area will be described below in the descriptions of the feature vector extraction unit 32.

The feature vector extraction unit 32 extracts feature vectors from image data of registration target objects. When the target object is a human face, the feature vector extraction unit 32 performs processing for extracting as feature vectors the data required for identification from image data containing faces. The feature vector extraction unit 32 extracts data required for identification from partial areas set by the partial feature quantity parameter determination unit 31. For example, the feature vector extraction unit 32 extracts luminance values in the partial areas as feature vectors. In addition to feature vectors by luminance values, the feature vector extraction unit 32 may extract invariable feature quantities with respect to positions of partial areas of objects, and feature quantities robust against positional variations, for example, luminance frequency distributions, as feature vectors.

When extracting luminance-based feature quantities, the feature vector extraction unit 32 may perform preprocessing on the image data to make it robust against illumination variations. The feature vector extraction unit 32 is able to improve the final authentication accuracy, for example, by performing correction processing such as gamma correction and histogram planarization and then performing feature quantity extraction on the image data. The feature vector extraction unit 32 applies values predetermined by the partial feature quantity parameter determination unit 31 as parameters for correction processing.

As described in the descriptions of the partial feature quantity parameter determination unit 31, the feature vector extraction unit 32 may perform feature quantity extraction on one partial area by using a plurality of parameters. The feature vector extraction unit 32 records partial feature quantities extracted by using different parameters in the registered object dictionary data storage unit 22, as different registered object dictionary data. Similar effects to those achieved by pseudo-registering objects under a plurality of conditions can be expected by performing feature quantity extraction using a plurality of parameters on one partial area. More specifically, to cope with a case where conditions such as illumination conditions largely differ between the time of registration and authentication, the feature vector extraction unit 32 performs feature quantity extraction under a plurality of conditions (parameters) at the time of registration. This enables preparing feature quantities having conditions close to variations which may possibly occur at the time of authentication.

The feature vector extraction unit 32 may extract a plurality of registration vectors based not only on the above-described preprocessing parameters but also on a plurality of parameters themselves for feature quantity extraction. For example, when extracting binarized luminance values as feature quantities, the feature vector extraction unit 32 may prepare a plurality of parameters (binarization threshold values) and extract a plurality of feature quantities based on a plurality of the prepared threshold values. When using the Local Binary Pattern (LBP) features frequently used for face authentication, the feature vector extraction unit 32 performs coding based on the luminance value difference between a pixel of interest and a target pixel. In this case, threshold values may be introduced as new parameters. Through binarization in terms of the luminance value difference larger and smaller than a threshold value instead of the simple magnitude of the luminance value, the feature vector extraction unit 32 is able to extract feature quantities robust against illumination variations. If the threshold value is increased, feature quantities become robust but individual differences are lost. There is a threshold value suitable for authentication according to the illumination conditions. The feature vector extraction unit 32 prepares a plurality of threshold values, performs feature quantity extraction, and register feature quantities as different registration vectors to cope with diverse illumination variations.

[Discriminator Learning Unit]

Figure 5:
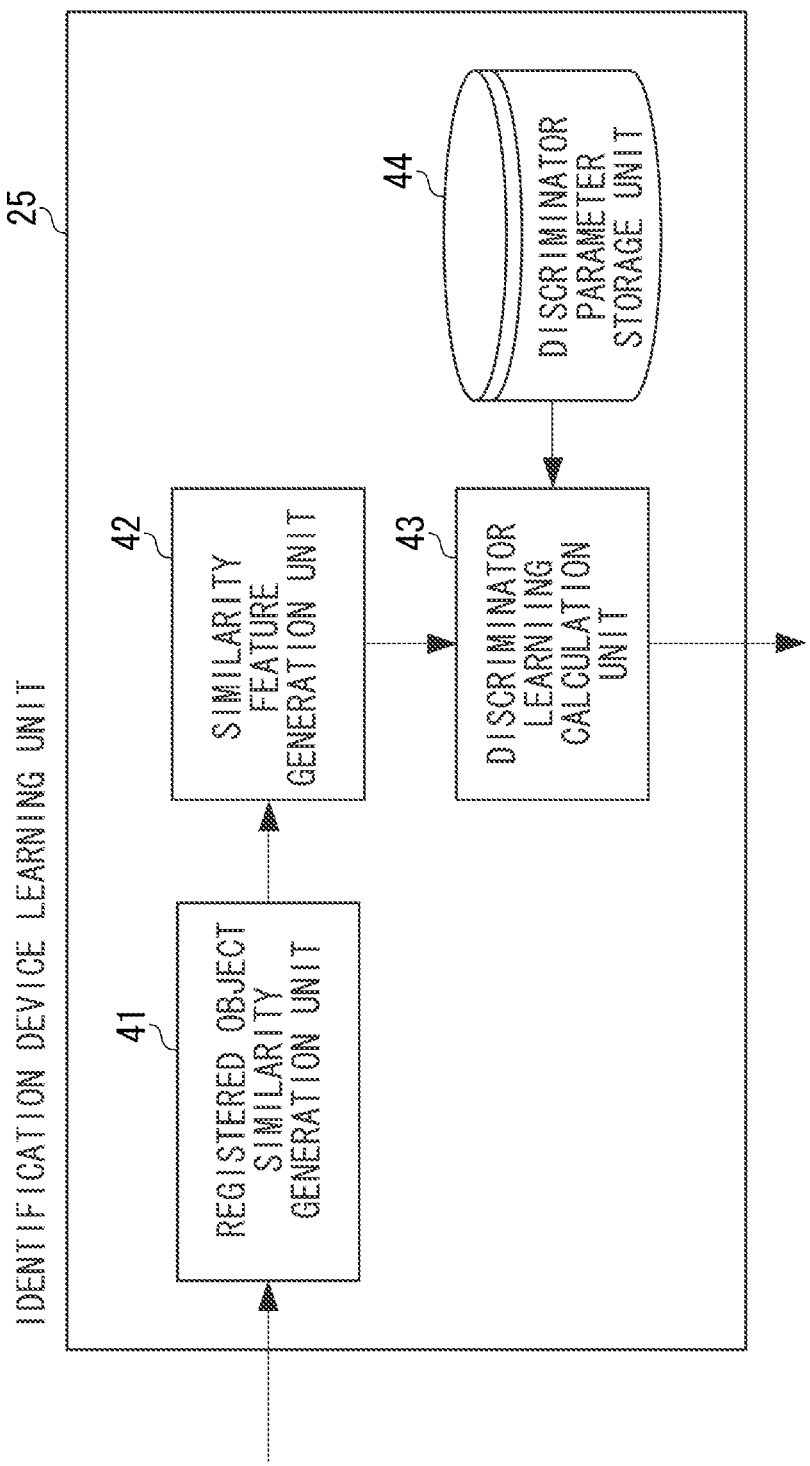
FIG. 5 illustrates an example of a functional configuration of a discriminator learning unit.

FIG. 5 illustrates an example of a functional configuration of the discriminator learning unit 25. The discriminator learning unit 25 includes a registered object similarity generation unit 41, a similarity feature generation unit 42, a discriminator learning calculation unit 43, and a discriminator parameter storage unit 44.

Based on the dictionary data of registered objects, the discriminator learning unit 25 performs processing for making the discriminator learn for discriminating identical objects to the registered objects. More specifically, based on the dictionary data of registered objects, the discriminator learning unit 25 generates data required to perform machine learning and individually makes the discriminator specific to the registered objects learn. The discriminator is considered to be a 2-class discriminator. The 2-class discriminator is a discriminator for determining whether target objects are identical. In a case where an object is a human face, the 2-class discriminator determines whether two persons are an identical person (Intra-Personal Class) or different persons (Extra-Personal Class).

The registered object similarity generation unit 41 generates a similarity of registered objects based on the partial feature quantities acquired from the registered object dictionary data storage unit 22. The processing performed by the registered object similarity generation unit 41 will be described in detail below with reference to FIGS. 6 and 7.

The similarity feature generation unit 42 generates similarity feature data based on the similarity data of the registered objects generated by the registered object similarity generation unit 41. The discriminator learning calculation unit 43 receives the generated similarity feature data.

The discriminator learning calculation unit 43 makes the discriminator that receives similarity features learn.

The discriminator parameter storage unit 44 stores parameters to be used by the discriminator learning calculation unit 43.

Processing performed and parameters used by the similarity feature generation unit 42, the discriminator learning calculation unit 43, and the discriminator parameter storage unit 44 will be described in detail below with reference to FIG. 8.

[Registered Object Similarity Generation Unit]

Figure 6:
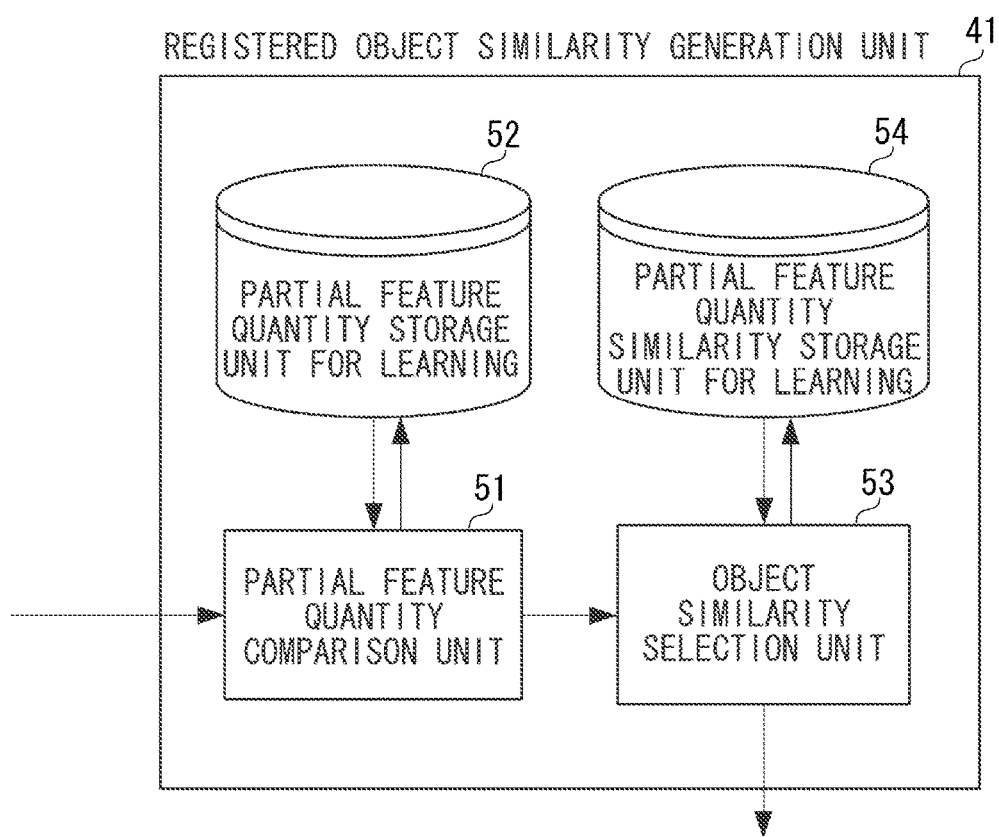
FIG. 6 illustrates an example of a functional configuration of a registered-object similarity generation unit.

FIG. 6 illustrates an example of a functional configuration of the registered object similarity generation unit 41. The registered object similarity generation unit 41 acquires dictionary data of target registered objects from the registered object dictionary data storage unit 22, and generates similarity data related to the registered objects required for the learning processing in the discriminator learning calculation unit 43. When using a 2-class discriminator as a discriminator, the registered object similarity generation unit 41 generates similarity data belonging to two different classes. More specifically, the registered object similarity generation unit 41 generates a similarity of objects belonging to the same class and a similarity of objects belonging to different classes. When the object is a human face, the registered object similarity generation unit 41 generates similarity data between partial feature quantities acquired from the human face of an identical person and similarity data between partial feature quantities of different persons, and outputs the generated similarity data together with label information for the class to which the similarity data belongs.

The registered object similarity generation unit 41 includes a partial feature quantity comparison unit 51, a partial feature quantity storage unit for learning 52, an object similarity selection unit 53, and a partial feature quantity similarity storage unit for learning 54. The partial feature quantity comparison unit 51 compares the partial feature quantities of registered objects with the partial feature quantities stored in the partial feature quantity storage unit for learning 52 to search for a partial feature quantity closest to the partial feature quantities of the registered objects.

The partial feature quantity storage unit for learning 52 stores partial feature quantities pre-extracted from prepared samples.

The object similarity selection unit 53 acquires from the partial feature quantity similarity storage unit for learning 54 the similarity of the partial feature quantities retrieved by the partial feature quantity comparison unit 51 and outputs the acquired similarity as similarity data. The object similarity selection unit 53 also outputs label information indicating which class the relevant similarity data belongs to, together with the similarity data, to enable use of the label information in processing of the discriminator learning calculation unit 43.

The partial feature quantity similarity storage unit for learning 54 stores the following similarity data. The similarity data refers to a similarity between the partial feature quantities stored in the partial feature quantity storage unit for learning 52 and the partial feature quantities extracted from an image different to the image from which the partial feature quantities of the object (an extraction source of the partial feature quantities stored in the partial feature quantity storage unit for learning 52) were extracted.

Figure 7:
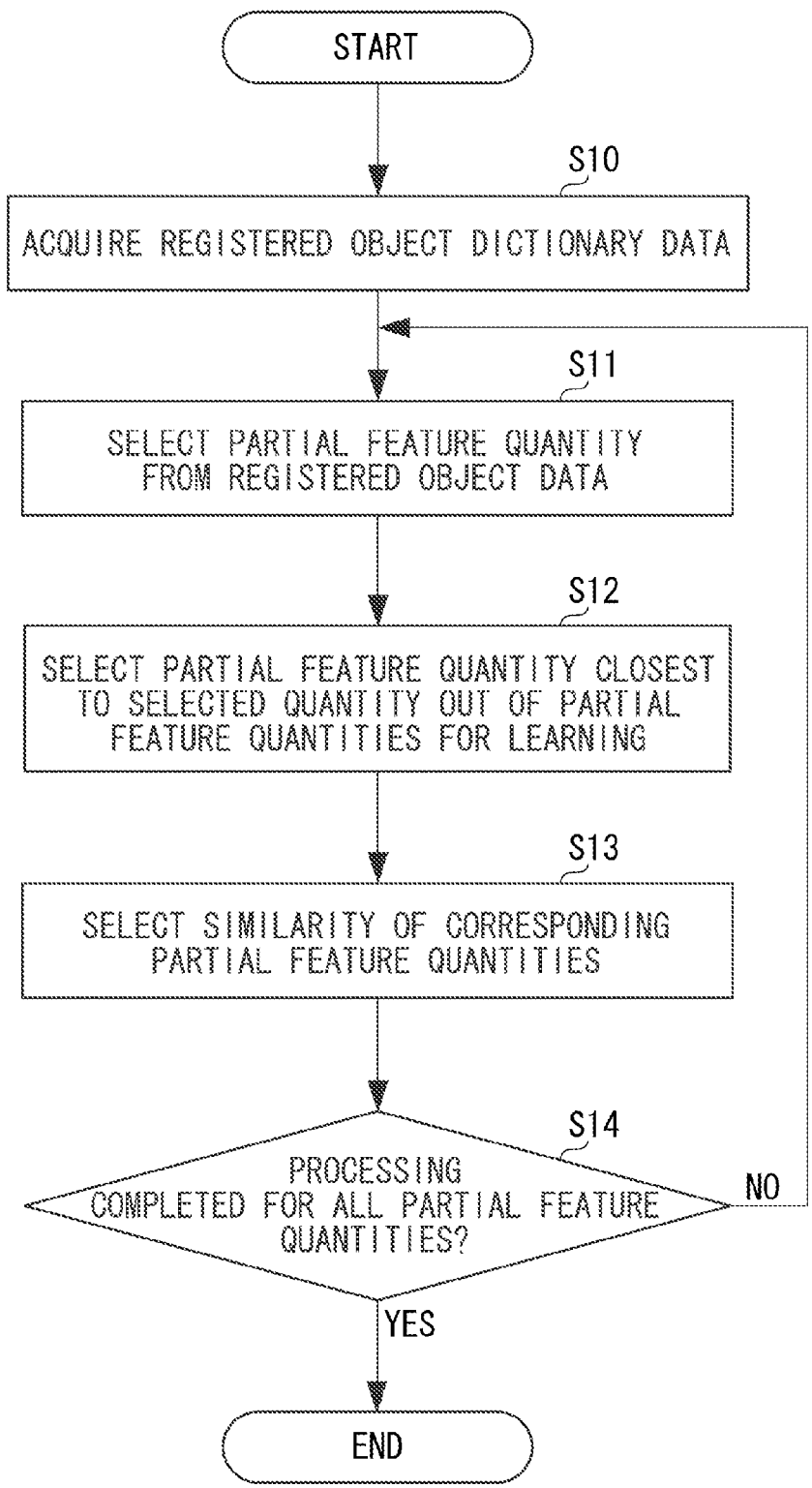
FIG. 7 is a flowchart illustrating an example of processing in the registered-object similarity generation unit.

FIG. 7 is a flowchart illustrating an example of processing of the registered object similarity generation unit 41. Processing of the registered object similarity generation unit 41 will be described below with reference to FIG. 7.

In step S10, the registered object similarity generation unit 41 acquires registered object dictionary data from the registered object dictionary data storage unit 22 via the registered object data selection unit 26. The above-described registered object dictionary data is dictionary data related to one registered object, and includes a plurality of partial feature quantities.

In step S11, the registered object similarity generation unit 41 selects one partial feature quantity from the registered object dictionary data acquired in step S10.

In step S12, the partial feature quantity comparison unit 51 selects a partial feature quantity closest to the value of the partial feature quantity selected in step S11 out of the partial feature quantities stored in the partial feature quantity storage unit for learning 52. The partial feature quantity comparison unit 51 records position information on the object in the partial feature quantity, and selects a partial feature quantity closest to the value of the partial feature quantity selected in step S11 out of the partial feature quantities corresponding to the same position. When the object is a human face, for example, the partial feature quantities comparison unit 51 searches for a feature quantity closest to feature quantities including the eyes of the face to be registered, out of prepared feature quantities including the eyes of various persons, assuming that the partial feature quantities are quantities clipped from portions including the eyes.

When the partial feature quantity comparison unit 51 selects a feature quantity closest to the value of the partial feature quantity selected in step S11 out of the partial feature quantities stored in the partial feature quantity storage unit for learning 52, the partial feature quantity comparison unit 51 uses the following methods. For example, one method handles each feature quantity as a vector (hereinafter referred to as a feature vector). This method obtains an inner product of each of the feature vectors stored in the partial feature quantity storage unit for learning 52 and the feature vector selected in step S11, and selects a feature quantity relevant to the feature vector showing the largest inner product value as the closest feature quantity. Another method calculates a distance (Euclid distance) L2 between each of the feature vectors stored in the partial feature quantity storage unit for learning 52 and the feature vector selected in step S11, and selects a feature quantity relevant to the feature vector showing the shortest distance as the closest feature quantity. If the partial feature quantities stored in the partial feature quantity storage unit for learning 52 do not include a partial feature quantity sufficiently close to the partial feature quantities of the registered objects (for example, determined by using a threshold value), the partial feature quantity comparison unit 51 needs to perform the following processing. For example, the partial feature quantity comparison unit 51 needs to calculate a weighted sum of the partial feature quantities stored in the partial feature quantity storage unit for learning 52. More specifically, the partial feature quantity comparison unit 51 generates a combined partial feature quantity, and performs processing for searching for a partial feature quantity sufficiently close to the partial feature quantities of the registered objects. A combined partial feature quantity is calculated by formula 1.

$$y = Aw + e \quad \text{(Formula 1)}$$

In formula 1, y indicates a partial feature vector of a registered object. A indicates a matrix that vertically arranges the partial feature vectors stored in the partial feature quantity storage unit for learning 52. w indicates a vector that represents the weight related to respective partial feature vectors of the matrix A. e indicates a vector that represents an error. The smaller the magnitude of the vector e representing an error, the closer the partial feature quantity selected in step S11 is to the combined partial feature quantity. A known optimization technique may be used to acquire the vector w that minimizes the magnitude $|e|$. For example, by applying a limitation to the magnitude of the vector w, the formula 1 is formulated to a format called Lasso, making it possible to acquire a solution by using such an algorithm as Orthogonal Matching Pursuit. If the partial feature quantity comparison unit 51 acquires a partial feature quantity close to the registered objects by using a weighted sum, it stores a weighting coefficient w.

The flowchart will be described again below.

In step S13, the object similarity selection unit 53 selects from the partial feature quantity similarity storage unit for learning 54 the similarity of the partial feature quantities corresponding to the partial feature quantity selected or combined in step S12. When a partial feature quantity is represented by a weighted sum of the learning partial feature quantities, the object similarity selection unit 53 needs to multiply the similarities of all of corresponding partial feature quantities by the same weighting coefficient w and then summarize resultant values to acquire the weighted sum. A plurality of similarities of learning partial feature quantities may be selected for one partial feature quantity. Similarity data having sufficient variations is required to learn the discriminator having a sufficient robustness in discriminator learning processing. It is more desirable for the object similarity selection unit 53 to actively select a plurality of similarity data items from the partial feature quantity similarity storage unit for learning 54. Therefore, the partial feature quantity similarity storage unit for learning 54 stores similarity data between the learning partial feature quantity selected in step S12 and the partial feature quantities extracted from an image different from the image from which the relevant partial feature quantities of the object (the extraction source of the relevant partial feature quantities) were extracted. The partial feature quantity similarity storage unit for learning 54 also stores similarity data related to the partial feature quantities extracted from objects of a different individual from the extracting source. When the object is a human face, the similarity with different partial feature quantities of an identical person corresponds to similarity data belonging to the class "Intra-Personal Class", and the similarity with partial feature quantities of different persons corresponds to similarity data belonging to the class "Extra-Personal Class." The object similarity selection unit 53 also outputs label information which is information about class to which the similarity data belongs, together with the similarity data. It is more desirable to apply diverse variations to combinations of object images for acquiring a similarity. Examples of variations include illumination variations (differences in illumination conditions at the time of image capturing), angular variations (differences in object aspect), and annual variations (differences in image capturing time). When the object is a human face, variations include facial expression variations (differences in facial expression). For example, it is desirable that combinations to be used include a combination of images having illumination variations, a combination of images having angular variations, and a combination of images having annual variations. When the object is a human face, a combination of images having facial expression variations may be prepared. Further, preparing various combinations of images having a plurality of variations enables coping with diverse variations. The partial feature quantity similarity storage unit for learning 54 stores the similarity between partial feature quantities calculated from a combination of images having diverse variations, making it possible to derive diverse similarity data related to partial feature quantities extracted from registered objects in one image. Generally, the number of combinations of different objects (Extra-Personal Class in the case of human face) is overwhelmingly larger than the number of combinations of identical objects (Intra-Personal Class in the case of human face). The object similarity selection unit 53 may adjust the two numbers to achieve balance. When the processing in step S13 is completed, the selection of the similarity corresponding to one partial feature quantity of the registered object ends.

In step S14, the registered object similarity generation unit 41 determines whether the processing in steps S11 to S13 is completed for all of the partial feature quantities of the registered object dictionary data acquired in step S10. When the registered object similarity generation unit 41 determines that the processing in steps S11 to S13 is completed for all of the partial feature quantities of the registered object dictionary data (YES in step S14), the processing exits the flowchart. On the other hand, when the registered object similarity generation unit 41 determines that the processing in steps S11 to S13 is completed for not all of the partial feature quantities of the registered object dictionary data (NO in step S14), the processing proceeds to step S11.

This completes descriptions of an overview of processing performed by the registered object similarity generation unit 41. The registered object similarity generation unit 41 generates a plurality of similarities based on the partial feature quantities of the registered objects to offer similarity data required for the discriminator learning calculation unit 43 to make the discriminator learn. More specifically, even if there is only one registered object, the registered object similarity generation unit 41 is able to generate similarity data having diverse variations between objects belonging to the same class. If similarity data having diverse variations is offered, the improvement in accuracy can be expected for the discriminator in identifying registered objects learned by the discriminator learning calculation unit 43.

[Discriminator Learning Processing]

Figure 8:
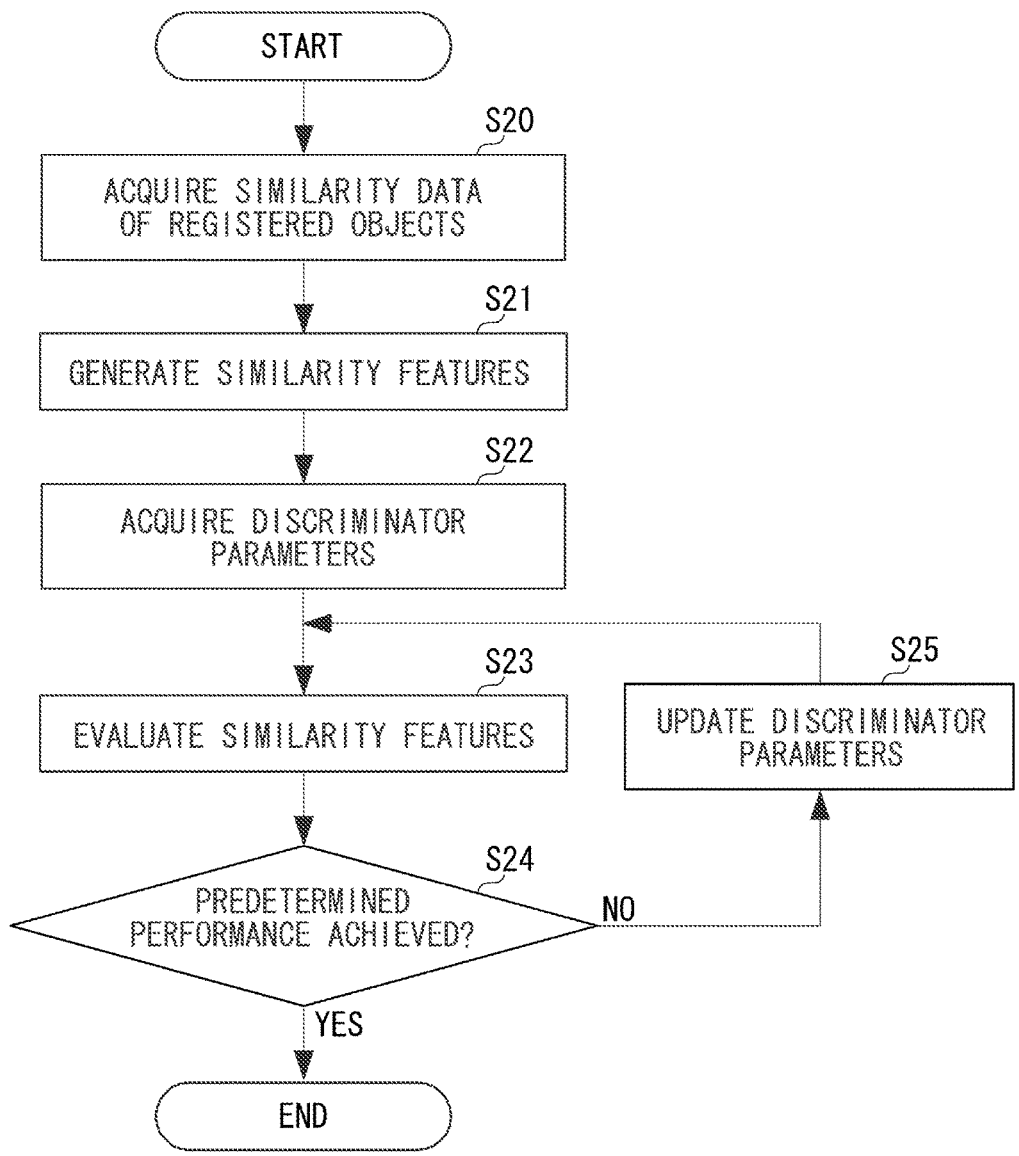
FIG. 8 is a flowchart illustrating an example of processing in the discriminator learning unit.

FIG. 8 is a flowchart illustrating an example of processing of the discriminator learning unit 25. Processing of the discriminator learning unit 25 will be described below with reference to FIG. 8.

In step S20, the similarity feature generation unit 42 acquires similarity data of the registered object from the registered object similarity generation unit 41.

In step S21, the similarity feature generation unit 42 generates similarity features based on the similarity data acquired in step S20. A similarity feature typically refers to a vector derived by connecting all of a plurality of similarities of partial feature quantities for one object. For example, when partial feature quantities are extracted from 30 positions for one object, the similarity feature has 30 dimensions. The similarity feature generation unit 42 also outputs label information for the class to which the relevant similarity features belong, together with similarity features each being derived by connecting similarities. When the object is a human face, class-related label information includes label information for an identical person (Intra-Personal Class) and label information for different persons (Extra-Personal Class).

In step S22, the discriminator learning calculation unit 43 acquires the parameters of the discriminator, parameters required for learning, etc. from the discriminator parameter storage unit 44. Typically, the parameters of the discriminator include the following. For example, if a support vector machine (SVM) for 2-class identification is used as the discriminator for identifying similarity features, the parameters of the discriminator are parameters required for calculations of the SVM. When support vectors and kernel functions are used for the discriminator, the parameters of the discriminator include kernel parameters. The parameters of the discriminator, which have been learned with prepared learning data, are stored in the discriminator parameter storage unit 44, and are used as initial values of the discriminator. Parameters required for learning include weighting of learning data belonging to the two classes. Further, parameters required for learning also include C parameters indicating the extent of permission for identification errors related to learning data.

In step S23, the discriminator learning calculation unit 43 evaluates similarity features based on the parameters acquired in step S22. Based on the label information indicating which class the relevant similarity data belongs to, acquired together with the similarity data acquired in step S20, the discriminator learning calculation unit 43 can numerically represent the evaluation accuracy of the similarity features acquired by the similarity feature generation unit 42 in step S21.

In step S24, the discriminator learning calculation unit 43 determines whether the relevant evaluation accuracy exceeds a threshold value. When the discriminator learning calculation unit 43 determines that the relevant evaluation accuracy exceeds the threshold value (YES in step S24), the processing exits this flowchart. On the other hand, when the discriminator learning calculation unit 43 determines that the relevant evaluation accuracy does not exceed the threshold value (NO in step S24), the processing proceeds to step S25.

In step S25, the discriminator learning calculation unit 43 updates the parameters of the discriminator. The method for updating the parameters of the discriminator depends on a specific algorithm of the discriminator. When an SVM is used as the discriminator, the discriminator learning calculation unit 43 solves a secondary plan problem based on the similarity features generated by the similarity feature generation unit 42 in step S21 as a method for updating the parameters of the discriminator, thus configuring a discriminator most suitable for the registered object.

This completes descriptions of the object registration unit 5.

The meaning of the discriminator learning unit 25 which learns the discriminator that inputs similarity features will be described below. A similarity feature is a vector derived by connecting similarities between partial feature quantities. Although a plurality of partial feature quantities is set and extracted for one object, the number of partial feature quantities is generally restrictive. In particular, in almost all cases, the setting of the number of partial feature quantities is remarkably smaller than the setting of the number of pixels in an image. For example, a human face as an example of a processing target object will be described below. Suppose a face image is composed of 100×100 pixels. When LBP features are used, if the relevant face image is vertically and horizontally divided into 10 areas, and a partial feature quantity for a 10×10-pixel area is taken, a partial feature quantity has 100 dimensions, which equals the number of pixels, for one partial area. This means that there is a total of one hundred 100-dimensional partial areas. In the discriminator for inputting feature quantities directly acquired from an image such as LBP features instead of similarity features, the load on learning the discriminator specialized for registered objects dramatically increases in comparison with a case where similarity features are input. More specifically, since the discriminator needs to input feature vectors of partial areas corresponding to two objects (a registered object and an input object which is a comparison target for the registered object), an input to the discriminator has at least 100 dimensions. If feature vectors of the relevant partial area are simply connected, an input to the discriminator has 200 dimensions. Further, since the discriminator needs an input for each partial area, it is necessary to repeat learning processing of the discriminator the same number of times as the number of partial areas (100 times). On the other hand, when similarity features are input, the number of input feature dimensions is 100 which equals the number of partial areas, and the number of times of learning the discriminator is one. Therefore, learning the discriminator that inputs similarity features having the same number of dimensions as the number of the partial feature quantities enables alleviating the load on machine learning, compared with learning the discriminator that inputs partial feature quantities.

Further, the discriminator that inputs similarity features also enables reducing the amount of data required for learning. The learning of the discriminator that inputs partial feature quantities requires partial feature quantities. To cope with diverse variations, it requires the same number of partial feature quantities as the number of combinations of variations. In the above-described example, one partial feature quantity has 100 dimensions and the similarity has one dimension (scalar). Further, the discriminator that inputs partial feature quantities requires two different feature quantities, an input object and a registered object, for comparison. Actually, for each partial area, the discriminator requires 200 times as much input data as is required by the discriminator that inputs similarity features.

The use of the discriminator that inputs similarity features can reduce a required amount of data and the number of calculations for learning, enabling application of online learning on apparatuses having limited resources, such as embedded apparatuses.

[Input Object Identification Unit]

Figure 9:
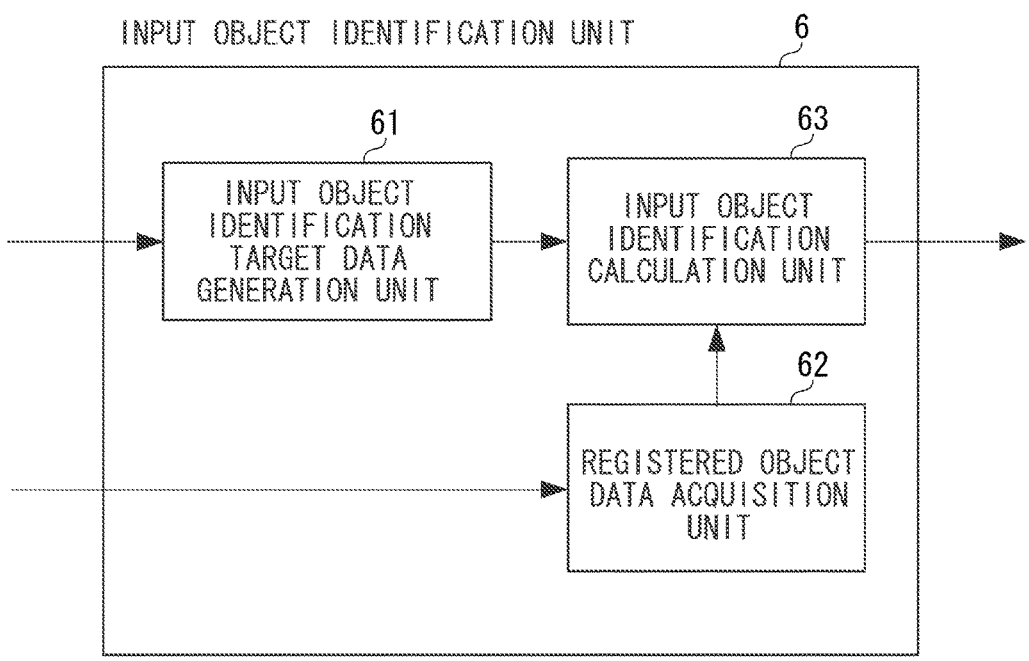
FIG. 9 illustrates an example of a functional configuration in an input object identification unit.

Input object identification processing will be described below. FIG. 9 illustrates an example of a functional configuration of the input object identification unit 6. The input object identification unit 6 includes an input object identification target data generation unit 61, a registered object data acquisition unit 62, and an input object identification calculation unit 63.

The input object identification target data generation unit 61 extracts information required for target object identification based on image data acquired from the image recording unit 4.

The registered object data acquisition unit 62 acquires dictionary data and discriminator information required to identify input objects from the object registration unit 5, in a state where the relevant information can be compared with identification target data acquired from the input object identification target data generation unit 61 (with the same number of dimensions of feature quantities). The input object identification calculation unit 63 performs input object identification processing based on the identification target data acquired from the input object identification target data generation unit 61 and the dictionary data acquired from the registered object data acquisition unit 62.

Figure 10:
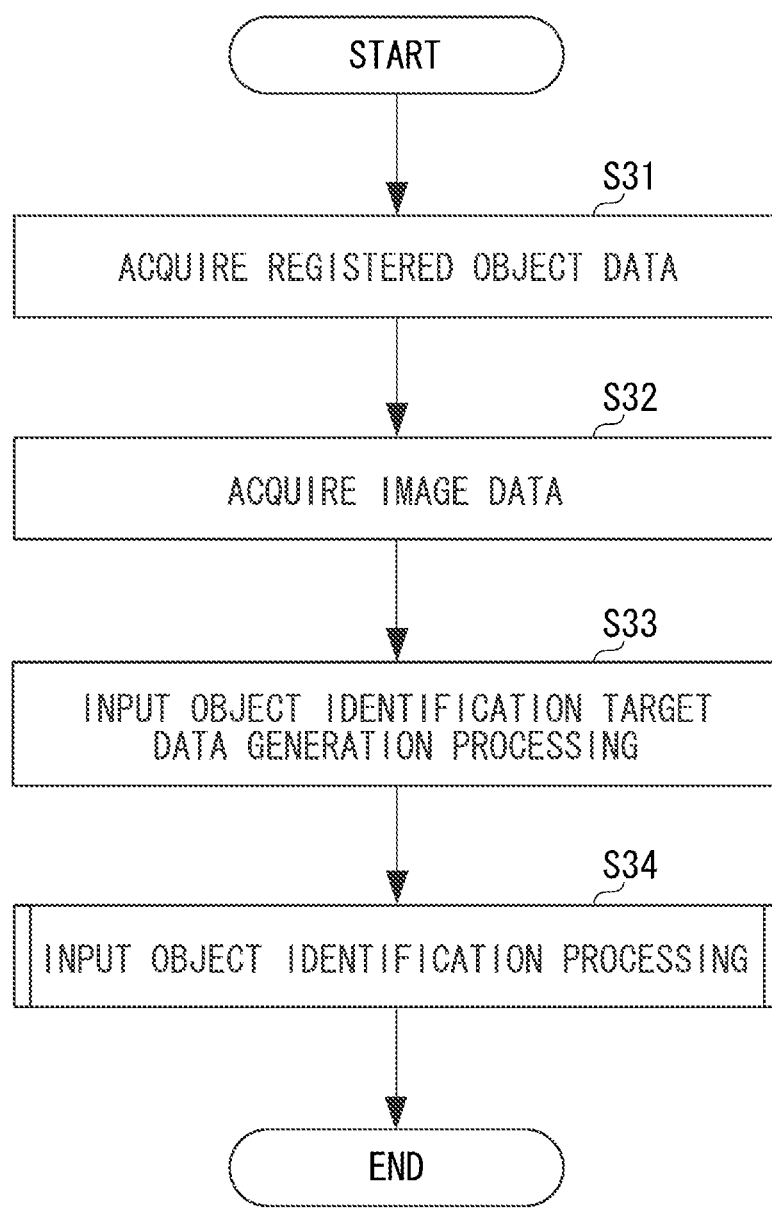
FIG. 10 is a flowchart illustrating an example of processing in the input object identification unit.

FIG. 10 is a flowchart illustrating an example of processing of the input object identification unit 6.

In step S31, the registered object data acquisition unit 62 acquires registered object data from the object registration unit 5.

In step S32, the input object identification target data generation unit 61 acquires image data of an input object from the image recording unit 4.

In step S33, the input object identification target data generation unit 61 performs input object identification target data generation processing. The processing in step S33 will be described in detail below with reference to FIG. 11.

In step S34, the input object identification calculation unit 63 performs input object identification calculation processing. The processing in step S34 outputs data in two different formats: a binary number (0 or 1) indicating the coincidence with the registered data (dictionary data), and a normalized output value as a likelihood (for example, a real number value from 0 to 1). Further, when there is a plurality registered objects (registrants), the input object identification calculation unit 63 may output the likelihood or only the identification result for a registered object having the highest degree of coincidence, for each registered object (registrant). Further, the input object identification calculation unit 63 may output the likelihood for the class to which the registered object belongs, instead of the likelihood for the registered object. More specifically, when the identification target is a person, the input object identification calculation unit 63 may output the likelihood for a personal identifier (ID) (name) instead of the result for each individual registered face image. The processing in step S34 will be described in detail below with reference to FIGS. 12 and 13.

This completes descriptions of processing of the input object identification unit 6.

[Input Object Identification Target Data Generation Unit]

Figure 11:
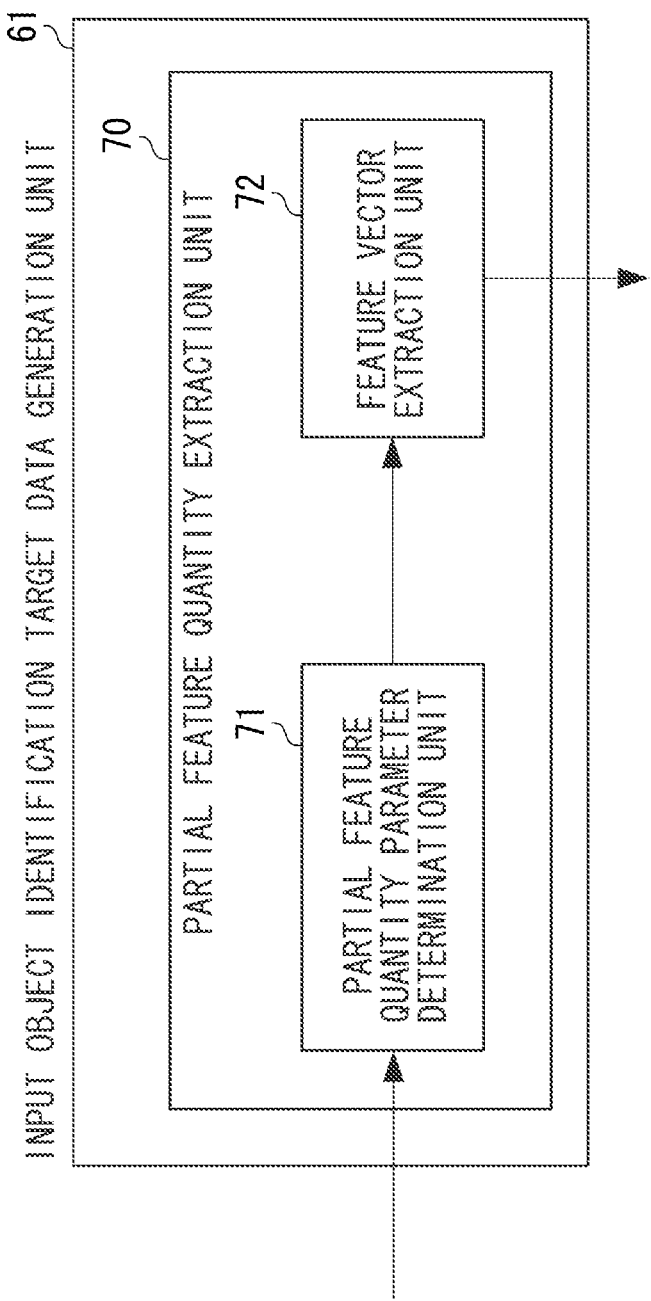
FIG. 11 illustrates an example of a functional configuration of an input-object-identification target data generation unit.

FIG. 11 illustrates an example of a functional configuration of the input object identification target data generation unit 61. The input object identification target data generation unit 61 includes a partial feature quantity extraction unit 70. The partial feature quantity extraction unit 70 includes a partial feature quantity parameter determination unit 71 and a feature vector extraction unit 72. The configuration and processing of the input object identification target data generation unit 61 are similar to those of the registered object dictionary data generation unit 21 described with reference to FIG. 4.

[Input Object Identification Calculation Processing]

Figure 12:
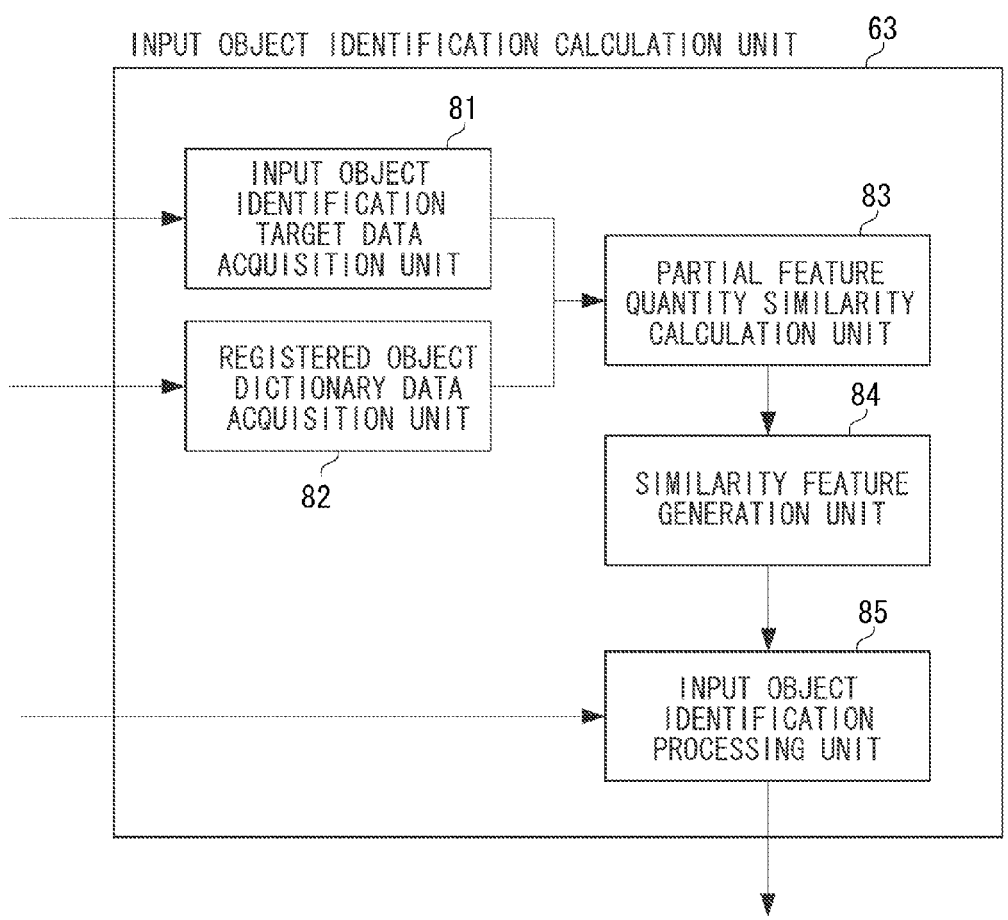
FIG. 12 illustrates an example of a functional configuration of an input-object-identification calculation unit.

FIG. 12 illustrates an example of a functional configuration of the input object identification calculation unit 63. The input object identification calculation unit 63 includes an input object identification target data acquisition unit 81, a registered object dictionary data acquisition unit 82, a partial feature quantity similarity calculation unit 83, a similarity feature generation unit 84, and an input object identification processing unit 85.

Figure 13:
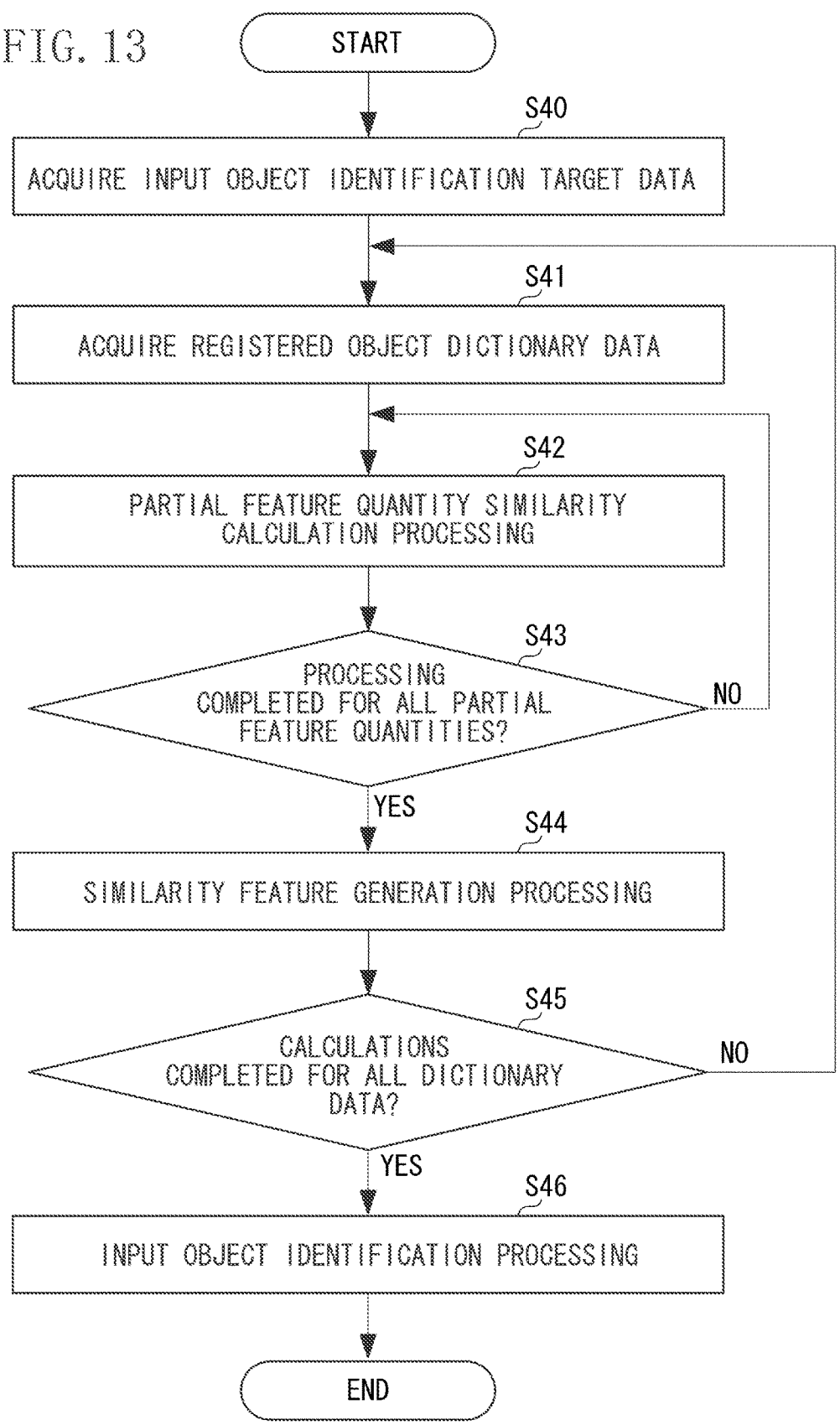
FIG. 13 is a flowchart illustrating an example of processing in the input-object-identification calculation unit.

FIG. 13 is a flowchart illustrating an example of processing of the input object identification calculation unit 63.

In step S40, the input object identification target data acquisition unit 81 acquires input object identification target data from the input object identification target data generation unit 61.

In step S41, the registered object dictionary data acquisition unit 82 acquires the dictionary data of the registered objects from the registered object data acquisition unit 62.

In step S42, the partial feature quantity similarity calculation unit 83 calculates similarities of partial feature quantities based on the partial feature quantities of the input object identification target data acquired in step S40 and the partial feature quantities of portions corresponding to the partial feature quantities in the dictionary data of the registered objects acquired in step S41. The relevant similarity is represented by the reciprocal of the Euclid distance between the partial feature vector of the input object and the partial feature vector of the registered object corresponding to each other. The relevant similarity may be represented by an angle formed by the relevant vectors instead of the Euclid distance. Further, as a general distance, the reciprocal of the Minkowski distance L represented by the following formula 2 may be employed.

$$L = \sqrt[b]{|x_1-y_1|^a + |x_2-y_2|^a + \ldots + |x_d-y_d|^a}$$ (Formula 2)

In formula 2, two vectors x and y have d dimensions respectively. Two required parameters a and b need to be predetermined by using samples for evaluation so that the best identification performance is achieved.

In step S43, the input object identification calculation unit 63 determines whether the similarity with the partial feature quantity in the input object identification target data acquired in step S40 has been acquired for all of the partial feature quantities in the dictionary data of the registered objects acquired in step S41. When the input object identification calculation unit 63 determines that the relevant similarity has been calculated for all of the partial feature quantities in the relevant dictionary data (YES in step S43), it instructs the similarity feature generation unit 84 to perform processing in step S44. On the other hand, when the input object identification calculation unit 63 determines that the relevant similarity has not been calculated for all of the partial feature quantities in the relevant dictionary data (NO in step S43), it instructs the partial feature quantity similarity calculation unit 83 to perform processing in step S42.

In step S44, the similarity feature generation unit 84 generates similarity features based on the similarity for each partial feature quantity calculated in step S42. Typically, the similarity feature generation unit 84 connects a plurality of similarities to derive one vector.

In step S45, the input object identification calculation unit 63 determines whether similarity features have been generated on the dictionary data for all of the registered objects. When the input object identification calculation unit 63 determines that similarity features have been generated on the dictionary data for all of the registered objects (YES in step S45), it instructs the input object identification processing unit 85 to perform processing in step S46. On the other hand, when the input object identification calculation unit 63 determines that similarity features have not been generated on the dictionary data for all of the registered objects (NO in step S45), it instructs the registered object dictionary data acquisition unit 82 to perform processing in step S41.

In step S46, the input object identification processing unit 85 performs input object identification processing. The above-described input object identification processing refers to processing for determining which registered object the input object corresponds to, based on the similarity with the dictionary data of all of the registered objects. Typically, the input object identification processing unit 85 inputs the similarity features acquired in step S44 to the discriminator specialized for each registered object acquired from the discriminator learning unit 25, and determines whether the input object is identical to the relevant registered object. When the input object identification processing unit 85 makes this determination, it may acquire the likelihood, compares the likelihood for a plurality of registered objects, and determines the likelihood having the maximum value out of the likelihoods for a plurality of the objects as a registered object corresponding to the input object. The input object identification processing unit 85 outputs to notify which registered object the input object corresponds to.

Through the processing according to the present exemplary embodiment, the object identification apparatus 100 is able to effectively utilize online learning while maintaining user-friendliness.

The object identification apparatus 100 is able to reduce the amount of learning data and alleviate the learning processing by inputting similarity features to the discriminator. Therefore, online learning can also be effectively performed on apparatuses having limited resources, such as digital cameras and mobile phones.

The object identification apparatus 100 searches for a partial feature quantity close to the partial feature quantity of the registered objects out of prepared learning partial feature quantities, stores the similarity of the relevant partial feature quantities when their variations occur, and uses the similarity as learning data, thus achieving the following effects. More specifically, the object identification apparatus 100 is able to prepare learning data sufficient for learning of the discriminator even if there is a small number of images (typically one image) of the registered object. Further, the object identification apparatus 100 stores the similarity instead of partial feature quantities to eliminate the need of storing partial feature quantities (or images) when their diverse variations occur, thus achieving the reduction of a large amount of data. Since only a small amount of learning data is required, user-friendliness is not degraded.

A second exemplary embodiment will be described below. The second exemplary embodiment differs from the first exemplary embodiment in that it searches for a partial feature quantity closest to the registered object and the input object out of the partial feature quantities stored in the partial feature quantity storage unit for learning 52, respectively, and adjusts variation conditions before performing similarity acquisition processing.

Processing according to the present exemplary embodiment will be described below. In the following descriptions, descriptions of elements equivalent to those in the first exemplary embodiment will be omitted.

The entire hardware configuration of the object identification apparatus 100 is similar to that according to the present exemplary embodiment.

The configurations of the registered object dictionary data generation unit 21 and the input object identification target data generation unit 61 according to the present exemplary embodiment partly differ from those according to the first exemplary embodiment. Processing according to the present exemplary embodiment partly differs from processing according to the first exemplary embodiment. The following descriptions will be made centering on differences from the first exemplary embodiment.

[Registered Object Dictionary Data Generation Unit]

Figure 14:
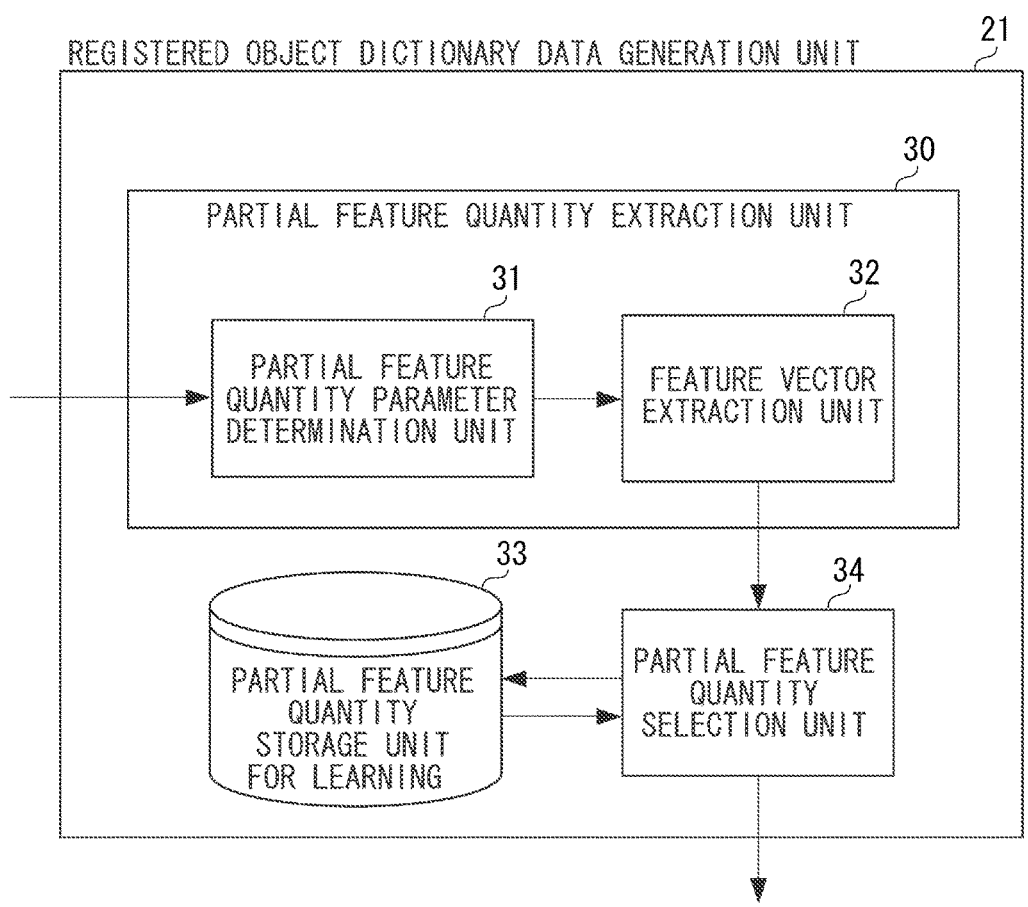
FIG. 14 illustrates an example of a functional configuration of the registered-object dictionary data generation unit.

FIG. 14 illustrates an example of a functional configuration of the registered object dictionary data generation unit 21. The registered object dictionary data generation unit 21 includes a partial feature quantity extraction unit 30, a partial feature quantity storage unit for learning 33, and a partial feature quantity selection unit 34. The partial feature quantity extraction unit 30 includes a partial feature quantity parameter determination unit 31 and a feature vector extraction unit 32. The present exemplary embodiment differs from the first exemplary embodiment in that the partial feature quantity storage unit for learning 33 and the partial feature quantity selection unit 34 are added. Functions of components other than the partial feature quantity storage unit for learning 33 and the partial feature quantity selection unit 34 are similar to those according to the first exemplary embodiment. The configuration of the input object identification target data generation unit 61 is similar to that illustrated in FIG. 14.

The partial feature quantity storage unit for learning 33 stores various partial feature quantities prepared for objects. The partial feature quantity storage unit for learning 33 also stores partial feature quantities when the variations occur in the object in an associative way. Therefore, when the partial feature quantity selection unit 34 accesses one partial feature quantity out of the partial feature quantities stored in the partial feature quantity storage unit for learning 33, it is also able to access partial feature quantities when the same object the diverse variations occur on the same partial area.

The partial feature quantity selection unit 34 searches for a partial feature quantity closest to the partial feature quantity of the registered object out of the partial feature quantities stored in the partial feature quantity storage unit for learning 33. Further, the partial feature quantity selection unit 34 selects a partial feature quantity with a least variation out of partial feature quantities of an identical object associated with the retrieved partial feature quantity. Processing performed by the partial feature quantity selection unit 34 will be described in detail below with reference to FIG. 15.

Figure 15:
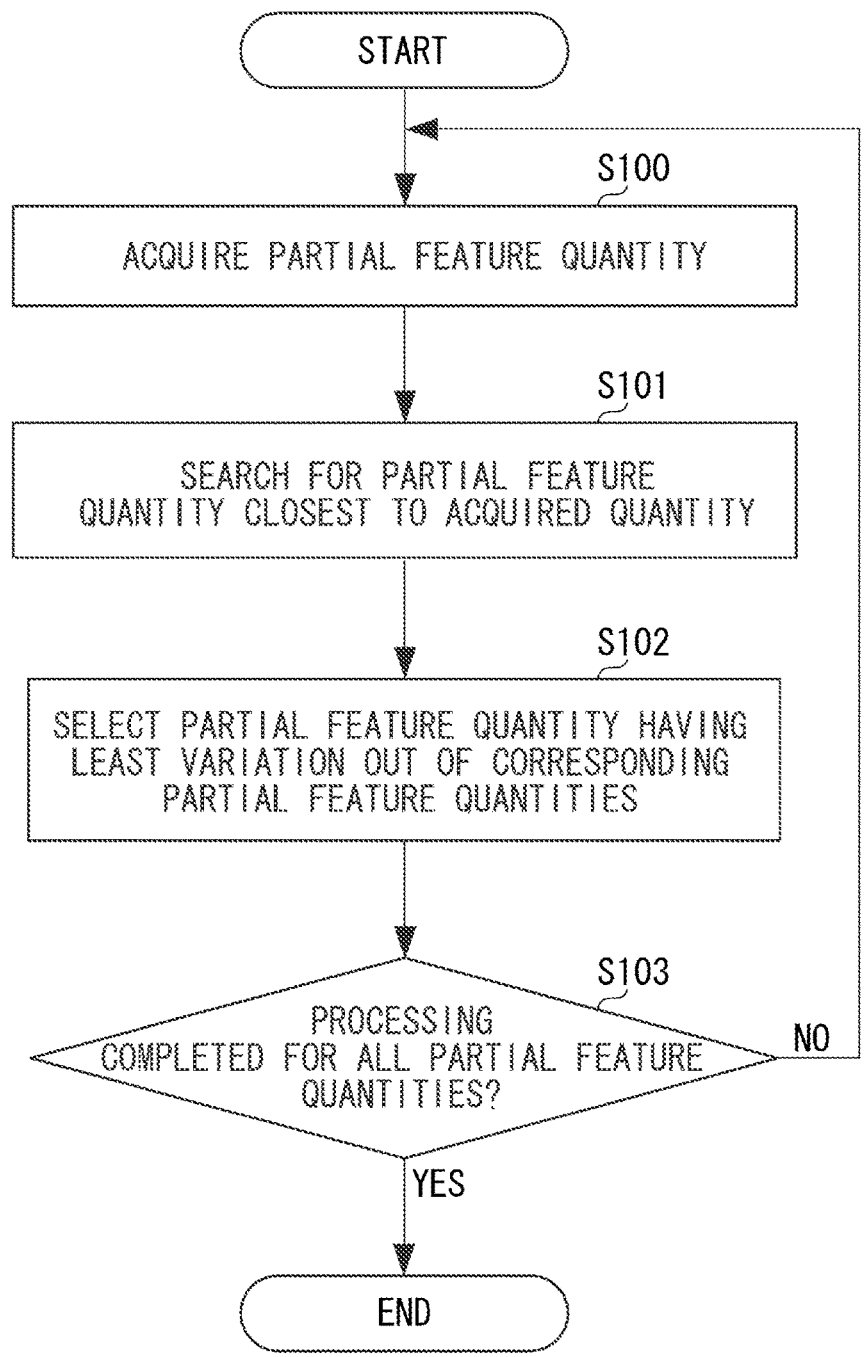
FIG. 15 is a flowchart illustrating an example of processing in a partial feature quantity selection unit.

FIG. 15 is a flowchart illustrating an example of processing of the partial feature quantity selection unit 34.

In step S100, the partial feature quantity selection unit 34 acquires a partial feature quantity from the partial feature quantity extraction unit 30.

In step S101, the partial feature quantity selection unit 34 performs processing for searching for a partial feature quantity closest to the partial feature quantity acquired in step S100 out of the partial feature quantities stored in the partial feature quantity storage unit for learning 33. Although the partial feature quantity selection unit 34 needs to perform the above-described search processing in a similar way to the method described in the descriptions of the registered object similarity generation unit 41 according to the first exemplary embodiment, the relevant processing may be performed at higher speed by using the following method. More specifically, this method enables high-speed search processing by performing additional processing related to the storage format of the partial feature quantity storage unit for learning 33 in advance. More specifically, the method performs pre-clustering on the partial feature quantities stored in the partial feature quantity storage unit for learning 33 to determine a representative partial feature quantity which is a cluster center. In the processing in step S101, the partial feature quantity selection unit 34 first performs comparison with the relevant representative partial feature quantity. When the partial feature quantity selection unit 34 calculates the closest representative partial feature quantity, it needs to search for the closest partial feature quantity within the cluster to which the relevant representative partial feature quantity belongs. This method enables remarkably reducing the amount of partial feature quantity comparison processing in step S101. In the object identification processing, each time an input image is input, the partial feature quantity selection unit 34 needs to search for a partial feature quantity closest to the partial feature quantity of the input object out of the partial feature quantities stored in the partial feature quantity storage unit for learning 33, and the high processing speed is important. Therefore, a search method like the above-described method provides larger effects of alleviating the processing amount and improving the processing speed than a simple successive search method.

In step S102, the partial feature quantity selection unit 34 selects a partial feature quantity with a least variation out of partial feature quantities of an object identical to the object for the partial feature quantity retrieved in step S101. Processing will be described below based on a case where the identification target object is a human face. When the face to be registered is an image of a turning away face, the partial feature quantity selection unit 34 selects a partial feature quantity for a similar human face out of the samples prepared in step S101. The possibility that the relevant partial feature quantity is a partial feature quantity extracted from the turning away face is higher than the possibility that it is a partial feature quantity extracted from a face without variations or a face with variations other than turn away. In step S102, the partial feature quantity selection unit 34 selects a partial feature quantity of an identical person with a least variation out of partial feature quantities for the turning away face, i.e., selects the partial feature quantity of the front face. When the partial feature quantity selection unit 34 performs the processing in step S102, it becomes possible, when an object with large variations is registered, to approximately calculate the partial feature quantity in a state where variations do not occur in the relevant object. Further, when the object identification apparatus 100 performs the processing in step S102, if an input object is input, it becomes possible to perform comparison between the registered object and the input object under the same conditions, resulting in improved identification accuracy. Further, if the object identification apparatus 100 performs the processing in step S102, it becomes possible, when learning the discriminator specialized for registered objects, to narrow the presumed variation range, enabling alleviation of the load on the discriminator.

In step S103, the partial feature quantity selection unit 34 determines whether the processing in steps S101 and S102 is completed for all of the partial feature quantities. When the partial feature quantity selection unit 34 determines that the processing in steps S101 and S102 is completed for all of the partial feature quantities (YES in step S103), the processing exits the flowchart. On the other hand, when the partial feature quantity selection unit 34 determines that the processing in steps S101 and S102 is not completed for all of the partial feature quantities (NO in step S103), the processing proceeds to step S100.

This completes descriptions of processing according to the second exemplary embodiment.

With the above-described processing according to the present exemplary embodiment, the object identification apparatus 100 is able to alleviate effects of variations in attributes (facial orientation, facial expression, illumination conditions, etc.) between a registered object and an input object. Further, it becomes possible, when learning the discriminator specialized for registered objects, to make an estimate of a small amount of variations between the registered object and the input object, enabling alleviation of the learning load (i.e., achieving high-precision learning of the discriminator based on a small amount of learning data).

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-189168, filed Sep. 17, 2014, which is hereby incorporated by reference herein in its entirety.

What is claimed is:

1. An object identification apparatus comprising:
a storage unit configured to, for objects in a plurality of sample images, store feature quantities of a plurality of predetermined partial areas, and a similarity of feature quantities for each partial area between objects of an identical individual and between objects of different individuals;
a selection unit configured to, for each partial area of an object in a registered image, select a corresponding sample image from the storage unit based on feature quantities of the partial area;

a setting unit configured to, for objects in the registered image, set a similarity of feature quantities for each partial area between objects of an identical individual and between objects of different individuals based on a similarity related to the selected sample images for each partial area;

a learning unit configured to make a discriminator learn based on the set similarity;

an acquisition unit configured to acquire a similarity for each partial area between an object in an input image and the object in the registered image; and a determination unit configured to determine whether the object in the input image is identical to the object in the registered image based on the similarity acquired by the acquisition unit and a result of identification by the learned discriminator.

2. The object identification apparatus according to claim 1, wherein, based on a similarity set to a partial feature quantity with a least variation out of partial feature quantities corresponding to the partial feature quantities of feature portions of the object in the registered image, the generation unit generates a similarity of the object.

3. The object identification apparatus according to claim 1, wherein, based on a similarity between partial feature quantities corresponding to the partial feature quantities of feature portions of the object in the registered image and partial feature quantities of the object with a variation set for the object corresponding to the partial feature quantities, the generation unit generates a similarity of the object.

4. The object identification apparatus according to claim 3, wherein the variation includes at least one of an illumination variation, an angular variation, and an annual variation.

5. The object identification apparatus according to claim 3, wherein the object is a human face and the variation is a facial expression variation.

6. The object identification apparatus according to claim 1, wherein the object is a human face.

7. The object identification apparatus according to claim 1, wherein the selection unit selects a sample image having most similar feature quantities out of the sample images.

8. The object identification apparatus according to claim 1, wherein the selection unit selects a plurality of sample images, and the setting unit sets a combined similarity to the object in the registered image based on the similarities of a plurality of the selected sample images.

9. An object identification method executed by an object identification apparatus having a storage unit storing, for objects in a plurality of sample images, feature quantities of a plurality of predetermined partial areas, and a similarity of feature quantities for each partial area between objects of an identical individual and between objects of different individuals, the object identification method comprising:

selecting, for each partial area of an object in a registered image, a corresponding sample image from the storage unit based on feature quantities of the partial area;

setting, for objects in the registered image, a similarity of feature quantities for each partial area between objects of an identical individual and between objects of different individuals based on a similarity related to the selected sample images for each partial area;

making a discriminator learn based on the set similarity;

acquiring a similarity for each partial area between an object in an input image and the object in the registered image; and determining whether the object in the input image is identical to the object in the registered image based on the similarity acquired by the acquisition unit and a result of discrimination by the discriminator.

10. A non-transitory storage medium storing a program for causing a computer having a storage unit storing, for objects in a plurality of sample images, feature quantities of a plurality of predetermined partial areas, and a similarity of feature quantities for each partial area between objects of an identical individual and between objects of different individuals to execute a method comprising:

selecting, for each partial area of an object in a registered image, a corresponding sample image from the storage unit based on feature quantities of the partial area;

setting, for objects in the registered image, a similarity of feature quantities for each partial area between objects of an identical individual and between objects of different individuals based on a similarity related to the selected sample images for each partial area;

making a discriminator learn based on the set similarity;

acquiring a similarity for each partial area between an object in an input image and the object in the registered image; and determining whether the object in the input image is identical to the object in the registered image based on the similarity acquired by the acquisition unit and a result of discrimination by the discriminator.

\* \* \* \* \*